United States Patent [19]

Watanabe et al.

[11] Patent Number: 5,694,625
[45] Date of Patent: Dec. 2, 1997

[54] CAMERA PROVIDED WITH AN AUTOMATIC FOCUS ADJUSTING APPARATUS

[75] Inventors: Toshimi Watanabe, Yokohama; Seiichi Yasukawa, Yotsukaido, both of Japan

[73] Assignee: Nikon Corporation, Tokyo, Japan

[21] Appl. No.: 515,967

[22] Filed: Aug. 16, 1995

[30] Foreign Application Priority Data

Sep. 7, 1994 [JP] Japan ................................ 6-213402
Sep. 7, 1994 [JP] Japan ................................ 6-213406

[51] Int. Cl.$^6$ .............................. G03B 3/00; G03B 3/10
[52] U.S. Cl. ................................ 396/102; 396/95
[58] Field of Search ....................... 354/400–409; 250/201.2, 201.8; 396/102, 95; 348/352, 345

[56] References Cited

U.S. PATENT DOCUMENTS

| | | | |
|---|---|---|---|
| 5,061,951 | 10/1991 | Higashihara et al. | 354/400 |
| 5,239,332 | 8/1993 | Muramatsu et al. | 354/402 |
| 5,270,763 | 12/1993 | Ogasawara | 354/402 |
| 5,392,088 | 2/1995 | Abe et al. | 354/402 |
| 5,448,051 | 9/1995 | Yamano | 250/201.2 |
| 5,598,247 | 1/1997 | Watanabe | 396/95 |

*Primary Examiner*—Safet Metjahic
*Assistant Examiner*—Eric Nelson

[57] ABSTRACT

A camera is provided with an automatic focus adjusting apparatus. The automatic focus adjusting apparatus includes a focus detecting device which detects the focus adjusted state of the photo-taking lens. A monitor device which monitors the movement of the photo-taking lens and an image plane movement speed calculating circuit which calculates an image plane movement speed on the basis of the result of the detection by the focus detecting device and the result of the monitoring by the monitor device. A moving object discrimination circuit discriminates an object as a moving object when the image plane movement speed is equal to or greater than a threshold value. A threshold value setting circuit sets the threshold value used for moving object discrimination in the moving object discriminating circuit. The threshold value setting circuit changes the threshold value when a continuous shooting device is driven.

13 Claims, 13 Drawing Sheets

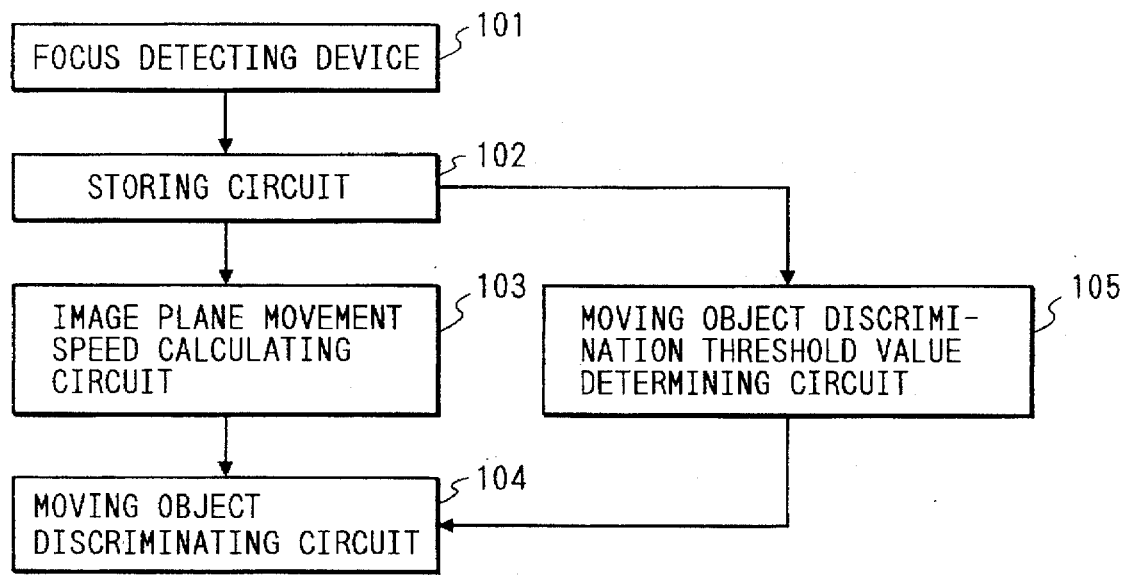
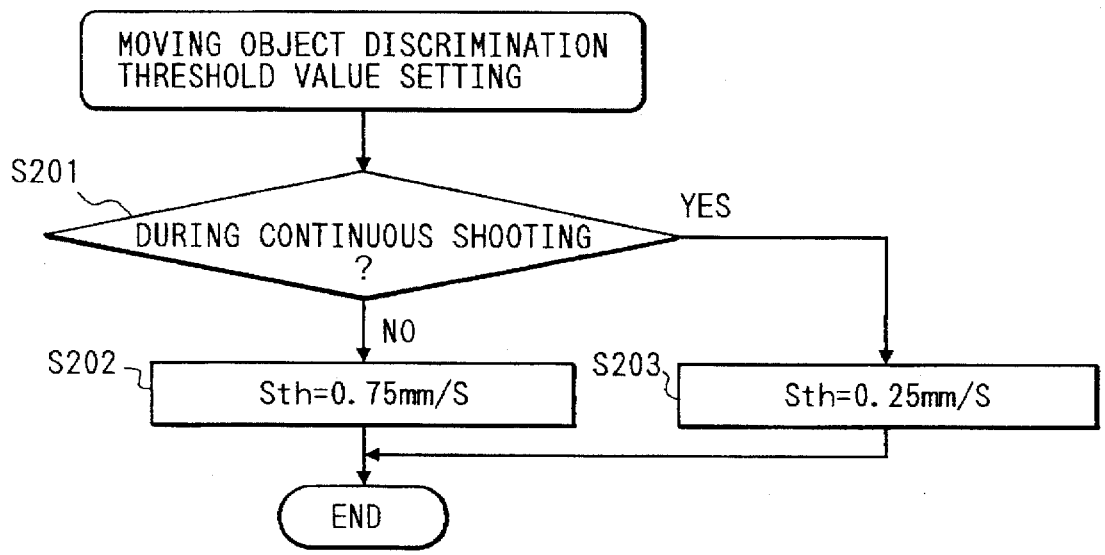

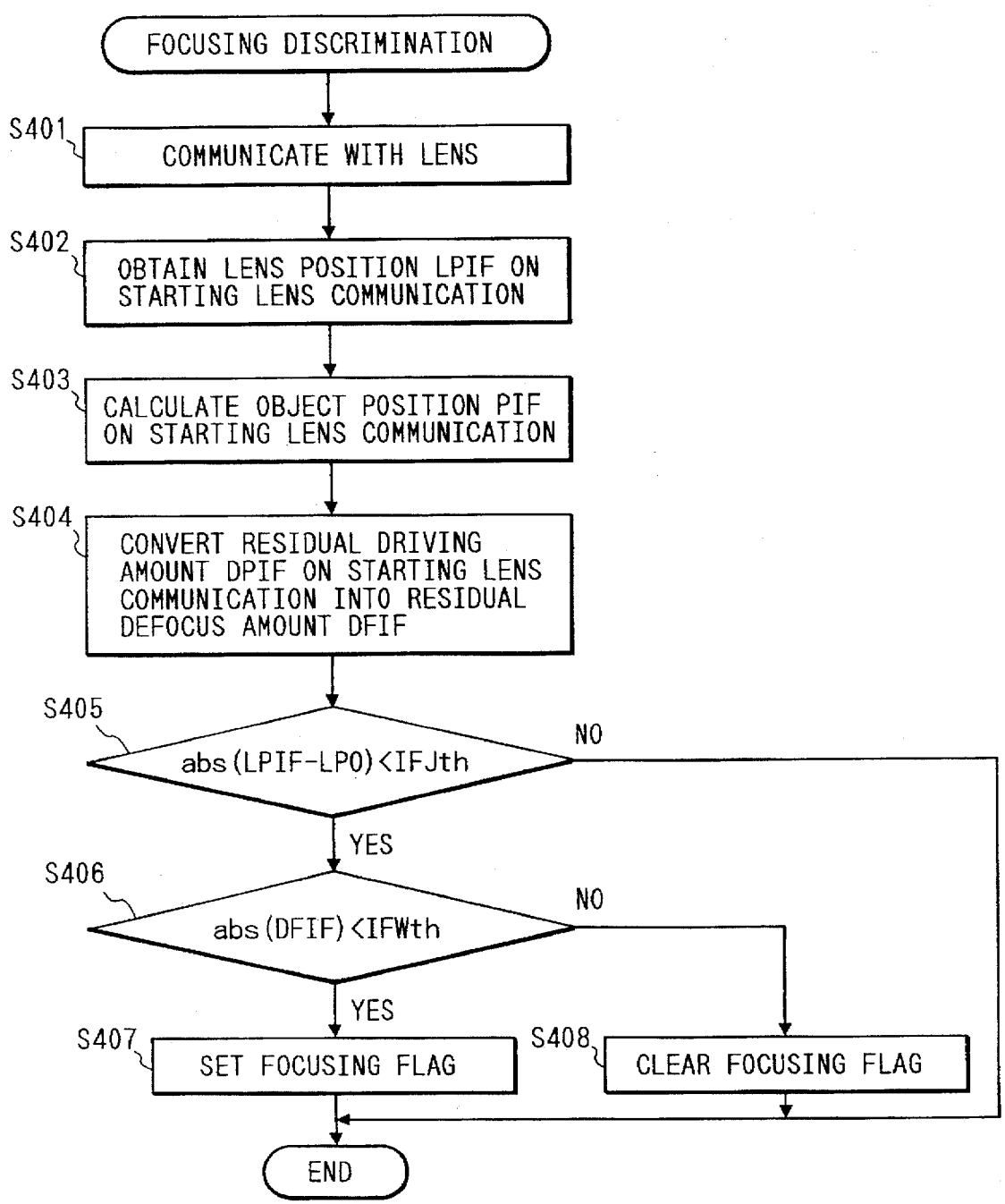

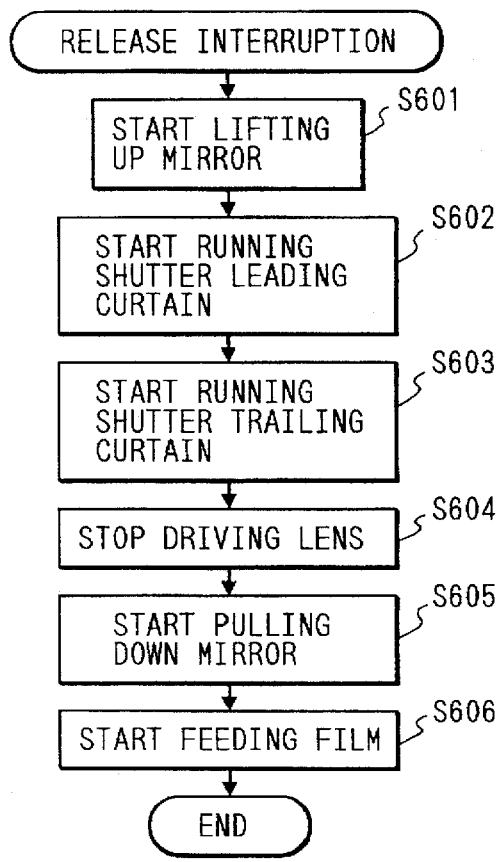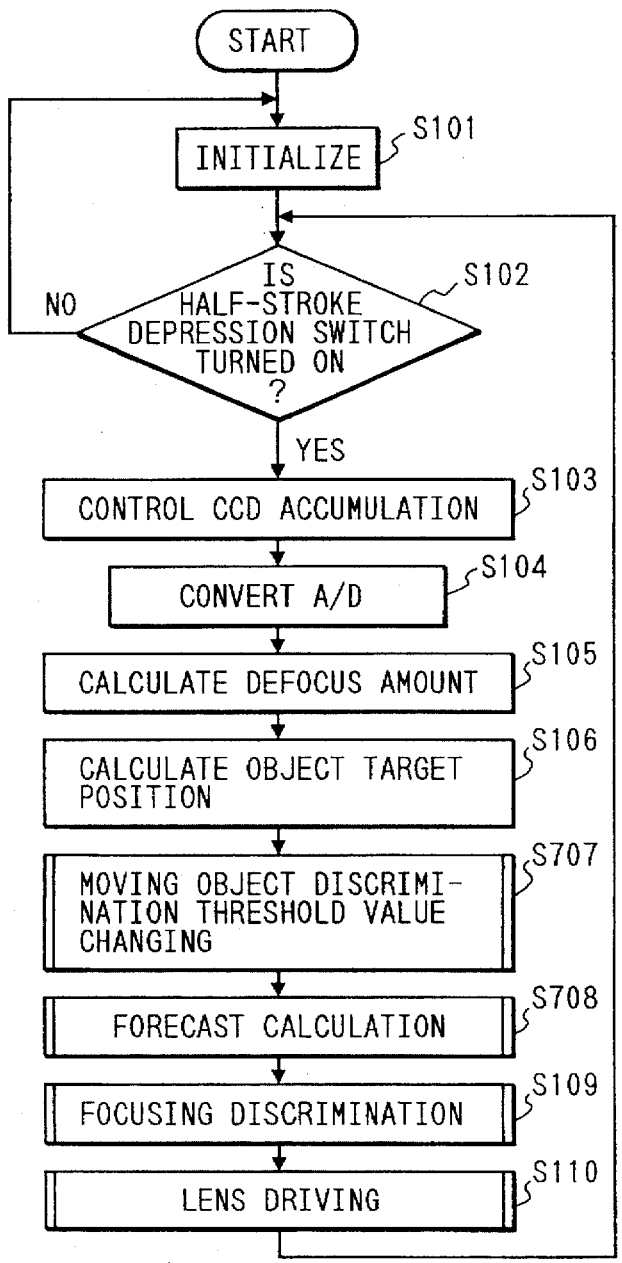

CAMERA PROVIDED WITH AN AUTOMATIC FOCUS ADJUSTING APPARATUS

BACKGROUND OF THE INVENTION

1. Field of the Invention

This invention relates to a camera provided with an automatic focus adjusting apparatus capable of forecast driving for forecasting an object position in the future. It also relates to an object movement detecting apparatus in a camera, a video camera or the like.

2. Related Background Art

There is known an automatic focus adjusting apparatus which calculates the image plane movement speed of an object, forecasts the movement of the object in the future when the image plane movement speed is greater than a threshold value, and drives a lens on the basis of the result of the forecast.

In the automatic focus adjusting apparatus according to the prior art, when the automatic focus adjusting device recognized an object as a moving to be a moving object during photography, a lens was driven to a driving target position at a time TT with the amount of movement of the moving object taken into account as shown in FIG. 1 of the accompanying drawings.

On the other hand, when the image plane movement speed of the moving object is low and the automatic focus adjusting apparatus judges the moving object to be a stationary body, the lens was driven to an object position P0 at a time TT as shown FIG. 2 of the accompanying drawings without the amount of movement of the moving object taken into account.

The automatic focus adjusting apparatus judged the moving object to be a moving body when the image plane movement speed is equal to or greater than a threshold value, and judged the moving object to be a stationary body when the image plane movement speed is less than the threshold value.

FIGS. 1 and 2 show the movement of the lens when release was done. In these figures, the time TT indicates the time of exposure, and a time interval TR indicates a release time lag. With respect to each case, the defocus amount during exposure is indicated by ER. (In FIGS. 1 and 2, the symbol I represents the accumulation in a photoelectric conversion element and the symbol C represents the time of focus detection calculation.)

The automatic focus adjusting apparatus, when it judged the moving object to be a moving body, drives the lens as previously described and can therefore make the defocus amount ER during exposure very small as shown in FIG. 1.

Also, generally, the time from the time T0 till the time TT is of the order of 150 msec. and when the focusing tolerance is of the order of 100 µm, the aforementioned threshold value has been of the order of 0.66 mm/sec.

However, when the set threshold value is high, there has been the problem that the automatic focus adjusting apparatus judged the moving object to be a stationary body and the defocus amount becomes great.

Also, when the set threshold value is low, there has been the problem that the automatic focus adjusting apparatus judged a stationary object (or an object low in the image plane movement speed) to be a moving body by the irregularity during the detection of the object and drives the lens and therefore the defocus amount becomes great.

On the other hand, there is known an object movement detecting apparatus which calculates the image plane movement speed from a present and a previous defocus amount, the time interval therebetween and the amount of movement of a lens and judges an object to be a moving body when the image plane movement speed is equal to or greater than a predetermined value. Further, a technique of inhibiting the judgment of a moving body when the defocus amount detected presently is equal to or greater than a predetermined value is known from Japanese Patent Application Laid-Open No. 62-139511.

In the prior art, when the latent defocus amount is greater than a predetermined value, the reliability of focus detection is regarded as being low and the judgment of a moving body is inhibited, whereby the misjudgment of a moving object by a focus detection error and an error of conversion into the amount of movement of the lens has been prevented.

In the prior art, however, when the latent defocus amount is small, the reliability of focus detection is regarded as being high and the judgment of a moving body was executed, but when the previous defocus amount is great, misjudgment of a moving object has sometimes been done due to a focus detection error and an error of change to the amount of movement of the lens.

A problem in the case of a stationary object will now be described with reference to FIG. 3 of the accompanying drawings.

When the current focus detection time is T0 and the amount resulting from the detected defocus amount having been converted into the amount of movement of the lens is DP0 (at T0) and the then lens position is LP0 (at T0) and the last focus detection time is T1 and the amount resulting from the detected defocus amount having been converted into the amount of movement of the lens is DP1 (at T1) and the then lens position is LP1, (at T1) LP1+DP1 and LP0+DP0 become equal to each other if there is no focus detection error and no error in the conversion from the defocus amount into the amount of movement of the lens.

However, when a focus detection error and an error in the conversion from the defocus amount into the amount of movement of the lens are included, the result becomes such as indicated by DP1E and thus, the movement of an object is forecast as indicated by a straight line A. Actually the object is a stationary object and therefore, when the future position of the object is forecast as indicated by the straight line A, there will be a great error.

SUMMARY OF THE INVENTION

So, the present invention has as an object thereof the provision of a camera provided with an automatic focus adjusting apparatus which can set a threshold value in conformity with a photographing situation to thereby take photographs small in defocus amount.

To solve the above-noted problem, describing the present invention with respect to an embodiment thereof shown in FIG. 4 of the accompanying drawings, a camera provided with the automatic focus adjusting apparatus of this embodiment is provided with a focus detecting device 5, 6, 7 which detects the focus adjusted state of a photo-taking lens 1, a monitor device 7, 10 which monitors the movement of the photo-taking lens 1, an image plane movement speed calculating circuit 7 which calculates the image plane movement speed on the basis of the result of the detection by the focus detecting device 5, 6, 7 and the result of the monitoring by the monitor device 7, 10, a moving object discriminating circuit 7 which discriminates an object as a moving object when the image plane movement speed is equal to or greater than a threshold value, a threshold value setting circuit 7 which sets said threshold value used for moving object discrimination by the moving object discriminating circuit 7, and a continuous shooting device 7, 14, 15 which effects continuous shooting, and the threshold setting circuit 7 changes said threshold value when the continuous shooting device 7, 14, 15 is driven.

In a camera provided with an automatic focus adjusting apparatus according to another embodiment, the threshold value setting circuit 7 changes the threshold value to a smaller value when the continuous shooting device 7, 14, 15 is driven smaller than when the continuous shooting device 7, 14, 15 is not driven.

The error of the image plane movement speed attributable to the irregularity of focus detection can be made small if the time interval of focus detection data used to calculate the image plane movement speed is made long. During continuous shooting, this time interval is great. In the present invention, the threshold value setting circuit lowers the threshold value of the moving object discrimination during continuous shooting. Therefore, even an object low in the image plane movement speed may be recognized as a moving object and thus, photographs which are only a little out of focus can be taken.

The present invention has as a further object thereof the provision of an object movement detecting apparatus in which the accuracy of the moving object discrimination of an object is not reduced by a focus detection error, the calculation error of the image plane movement speed, etc.

To solve the above-noted problem, an object movement detecting apparatus according to another embodiment, as shown in FIG. 5, of the accompanying drawings, is an object movement detecting apparatus provided with a focus detecting device 101 which detects the focus adjusted state of a photo-taking lens, a storing circuit 102 which stores therein focus adjustment information detected by said focus detecting device, an image plane movement speed calculating circuit 103 which calculates the image plane movement speed on the basis of the focus adjustment information stored in said storing circuit, and a moving object discriminating circuit 104 which discriminates whether the image plane movement speed calculated by said image plane movement speed calculating circuit is equal to or greater than a threshold value to thereby discriminate a moving object, characterized by a moving object discrimination threshold value determining circuit which determines the threshold value of said moving object discrimination based on the focus adjustment information stored in said storing circuit.

The present invention is designed such that the focus adjustment information detected by the focus detecting device is stored, to thereby determine the threshold value for discriminating on the basis of said focus adjustment information at a plurality of times in the past whether the object is a moving object, and can therefore decrease the error of the moving object discrimination by a focus detection error, the error of the image plane movement speed, etc.

BRIEF DESCRIPTION OF THE DRAWINGS

FIG. 5 is a schematic diagram of the present invention.

FIG. 7 is a flow chart of moving object discrimination threshold value setting.

FIG. 12 is a flow chart of focusing discrimination.

FIG. 16 is a flow chart of release interruption.

FIG. 18 is a main flow chart of a camera.

DETAILED DESCRIPTION OF THE PREFERRED EMBODIMENTS

First Embodiment

Figure 4:
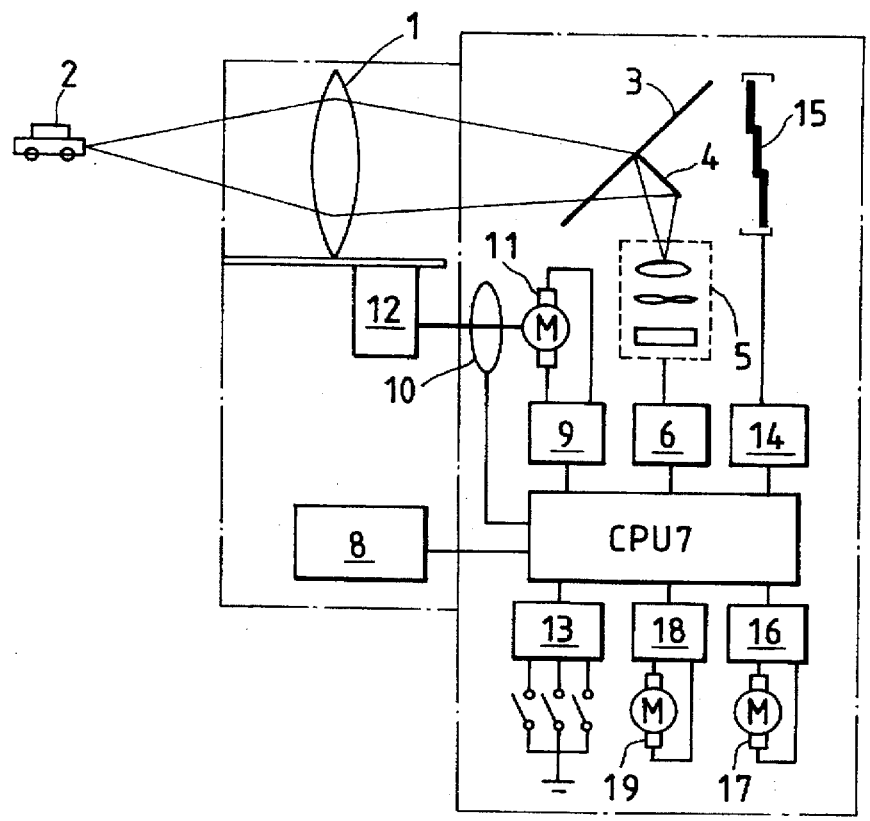
FIG. 4 shows the construction of a camera system according to an embodiment of the present invention.

FIG. 4 shows the construction of a camera system which is an embodiment of the present invention. Part of light from an object 2 passed through a photo-taking lens 1 is directed to an AF module 5 by a main mirror 3 and a sub-mirror 4 and is converted into an electrical signal representative of the focus adjusted state of the photo-taking lens 1 by the AF module 5. The AF module 5 is a conventional focus detecting device comprised of a re-imaging optical system and a sensor, and is controlled by a sensor driving circuit 6. The electrical signal representative of the focus adjusted state is A/D-converted by a CPU 7 and is stored into a memory in the CPU 7. A lens information storing circuit 8 stores therein information inherent to the lens such as the focal length of the photo-taking lens 1 and the defocus amount—lens driving amount conversion coefficient. The lens driving amount is calculated on the basis of data stored in the CPU 7 and the data of the defocus amount—lens driving amount conversion coefficient stored in the lens information storing circuit 8, and on the basis of this lens driving amount, the CPU 7 drives and controls a motor control circuit 9 and an AF motor 11 while monitoring the lens driving amount or the lens position by an encoder 10. The drive force from the AF motor 11 is transmitted to a lens moving mechanism 12 to thereby effect focus adjustment. An operating member 13 is comprised of a plurality of switches. The operating member 13 is comprised of a switch SW1 (hereinafter referred to as the half-stroke depression switch) adapted to be closed by the first stroke depression of a half-stroke depression button, a switch SW2 (hereinafter referred to as the full-stroke depression switch) adapted to be closed by the second stroke depression of the half-stroke depression button, etc. The CPU 7 starts to drive the lens upon the closing of the half-stroke depression switch. The CPU 7 controls an SQ motor 17 through an SQ motor control unit 16 by the closing of the full-stroke depression switch to thereby move up the main mirror 3 and the sub-mirror 4. After moving them up, the CPU 7 controls a shutter 15 through a shutter control unit 14 to thereby start exposure. After the termination of exposure, the CPU 7 reversely rotates the SQ motor 17 to thereby move down the main mirror 3 and the sub-mirror 4 to predetermined positions and at the same time, charges the shutter for the next exposure. Further, the CPU 7 rotates a feed motor 19 through a feed motor control unit 18 to feed film, thereby feeding the film. The above-described control is executed by a software in the CPU 7. The routine of the software will be described later on the basis of flow charts.

Figure 6:
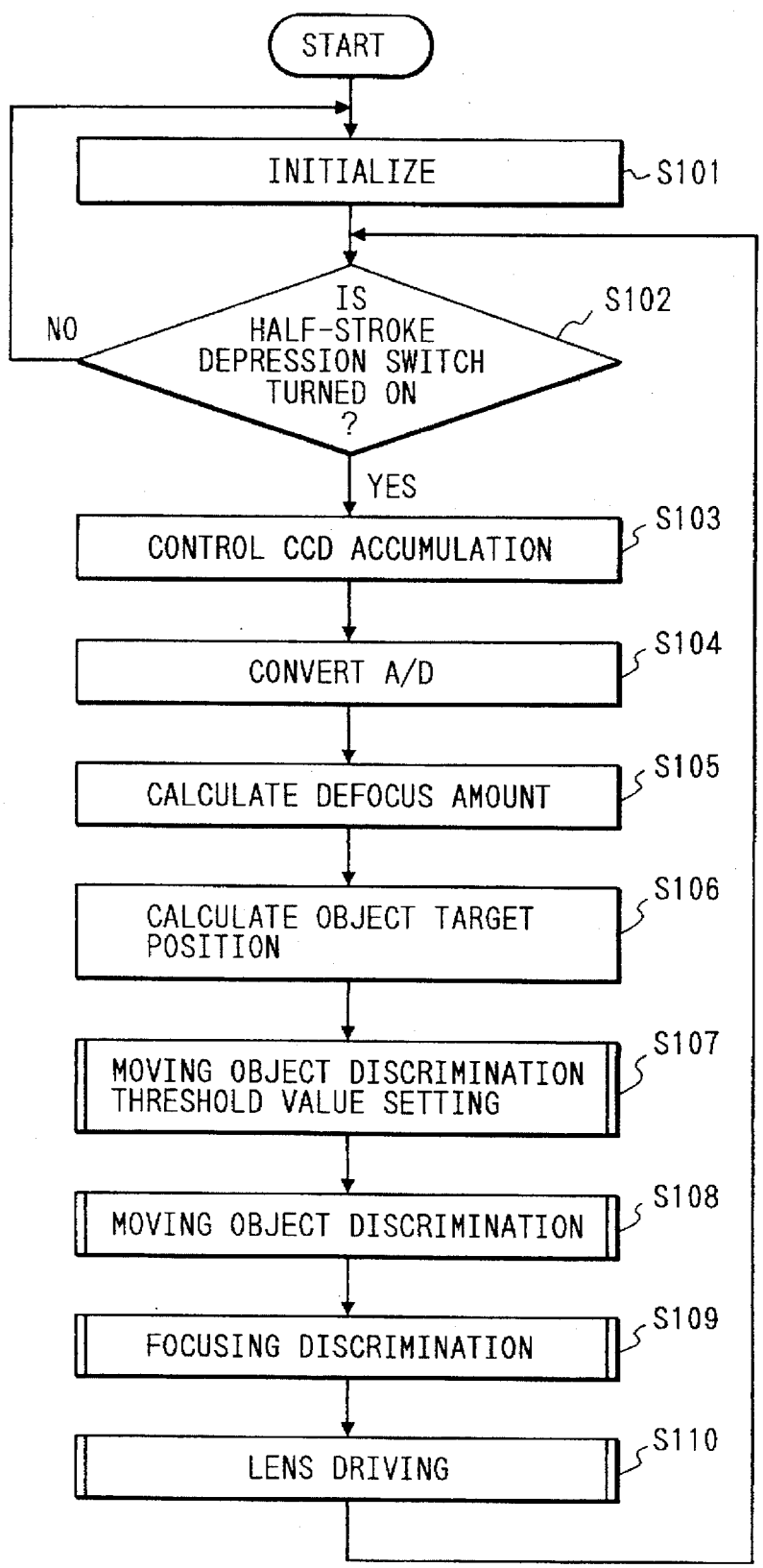
FIG. 6 is a main flow chart of a camera.

FIG. 6 is the main flow chart of the present invention.

S101 effects the initialization of a memory and flags used, for example, the defocus amount detected in the past, the central time of the charge accumulation time of the CCD sensor of the AF module 5, a moving object flag (indicating that the object is a moving object), an in-focus flag (indicating that the photo-taking lens is in focus), etc.

S102 tests whether the half-stroke depression switch is ON, and if it is not ON, return is made to S101, and if it is ON, advance is made to S103. S103 is the subroutine of accumulation control. In the accumulation control subroutine, the control of the starting and termination of CCD accumulation is effected and further, the feedback pulse from the encoder 10 from the start till the termination of accumulation is integrated to calculate the average lens position LP0 during calculation, thereby finding the average lens position LP0. In order to obtain the lens information (such as the defocus amount, the lens driving amount conversion coefficient and an open F value) at an accumulation central time T0, lens communication is started at the time T0. Here, the lens side is adapted to send the lens information at the start of the lens communication.

S104 A/D-converts an analog signal photoelectrically converted in the subroutine of accumulation control and stores it into a memory contained in the CPU 7.

S105 is the conventional defocus amount calculation subroutine. Here, the defocus amount DF0 is calculated on the basis of the photoelectrically converted signal stored in the memory.

S106 calculates the lens movement amount LP0 from the average lens position LP0 during calculation on the basis of the defocus amount DF0 calculated at S105 and the defocus amount—lens driving amount conversion coefficient LD0 (KL, L) obtained at the central time of charge accumulation, and calculates the object target position P0 at the accumulation central time T0. The object target position P0 represents the object position at the accumulation central time T0. The accumulation of the object target position P0 is effected as shown below. First, the CPU 7 converts the defocus amount DF0 into a lens movement amount DP0 as converted in terms of feedback pulse. At this time, the lens movement amount DP0 is calculated as shown by the following expression (1) by the use of the two coefficients of the defocus amount—lens movement amount conversion coefficient LD (KL, L) obtained the accumulation central time now and the lens driving amount—pulse conversion coefficient KB (a fixed value in the camera body).

$$DP0 = KB * KL * DF0 / (1 - L * DF0) \tag{1}$$

Since the defocus amount DF0 obtained by the focus detection now corresponds to the defocus amount at the average lens position during the accumulation now, the object target position P0 is calculated as shown by the following expression (2)

$$P0 = DP0 + LP0 \tag{2}$$

To calculate the object target position accurately, the defocus amount—lens movement amount conversion coefficient at the average lens position LP0 during accumulation is necessary, but in the present embodiment, for the simplification of description, the difference between the defocus amount—lens movement amount conversion coefficient obtained at the accumulation central time and the defocus amount—lens movement amount conversion coefficient at the average lens position during accumulation is regarded as being small.

S107 is the moving object discrimination threshold value setting subroutine and sets the threshold value of the image plane movement speed for discriminating a moving object in the moving object discrimination subroutine.

S108 is the moving object discrimination subroutine and discriminates on the basis of the defocus amount calculated in the defocus amount calculation subroutine and the stored past focus detection information (the defocus amount, the average lens position and the accumulation central time) whether the object is a moving object, and forecasts the movement of the object in the future.

S109 is the focusing discrimination subroutine and discriminates whether the lens is in focus now. S110 calculates the control amount necessary to actually effect lens driving.

The details of each subroutine will now be described.

Description will first be made of the moving object discrimination threshold value setting subroutine of FIG. 7. S201 discriminates whether continuous shooting is going on, and if continuous shooting is going on, the threshold value Sth of moving object discrimination is set to 0.25 mm/sec. (S203). If continuous shooting is not going on, the threshold value Sth of moving object discrimination is set to 0.75 mm/sec. (S202).

Figure 8:
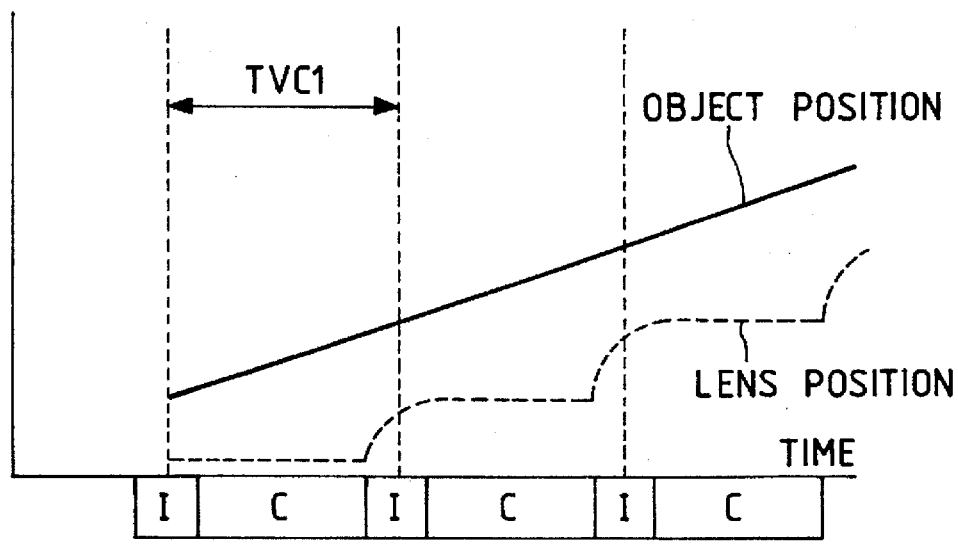
FIG. 8 is a schematic graph representing the time interval of ordinary focus detection.
Figure 9:
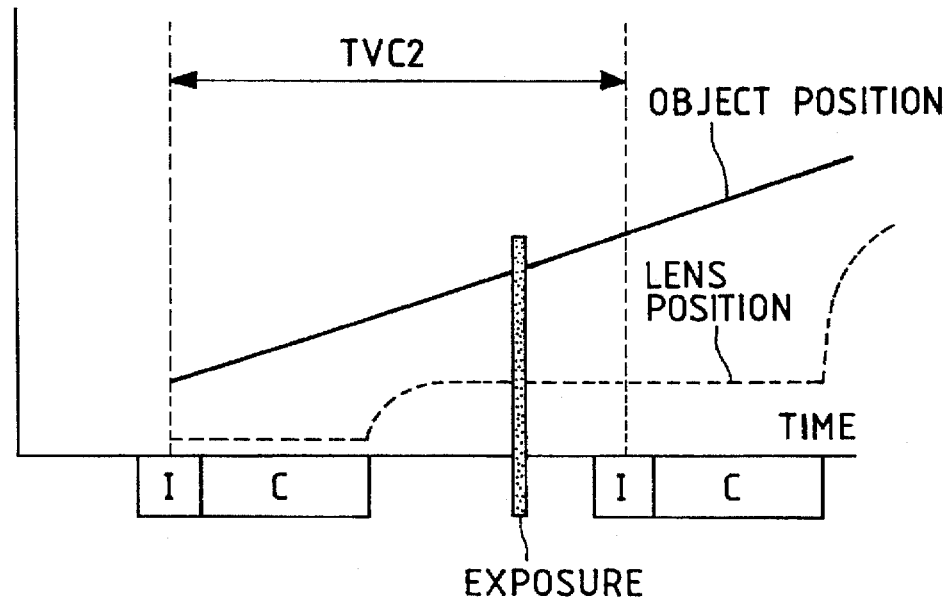
FIG. 9 is a schematic graph representing the time interval of focus detection during continuous shooting.

FIG. 8 is a graph representing the time of ordinary focus detection during which continuous shooting is not effected, and FIG. 9 is a graph representing the time of focus detection during continuous shooting. In FIGS. 8 and 9, the symbol I represents the accumulation in the photoelectric conversion element and the symbol C represents the time of focus detection calculation.

Generally, the error of the image plane movement speed attributable to the irregularity of focus detection is in inverse proportion to the time interval of focus detection.

As shown in FIGS. 8 and 9, in the case of continuous shooting, the time interval of focus detection is longer than the time interval of ordinary focus detection during which continuous shooting is not effected and therefore, even if the threshold value of moving object discrimination is made small, the error of the image plane movement speed attributable to the irregularity of focus detection can be made negligibly small. Therefore, as previously described, the threshold value Sth of moving object discrimination in the case of continuous shooting can be set to 0.25 mm/sec. and even an object low in movement speed can be judged to be a moving object and thus, a photograph small in defocus amount (only a little out of focus) can be taken.

The forecast calculation subroutine of FIG. 10 will now be described. S301 calculates the speed of the movement of the image plane (image plane movement speed) caused by the movement of the object when it is supposed that the position of the lens has been fixed and the speed of the changing of the object position (in-focus position changing speed). The image plane movement speed is utilized for moving object discrimination and the in-focus position changing speed is utilized for lens movement control. A method of calculating the image plane movement speed and the in-focus position changing speed will now be described with reference to FIG. 11. The defocus amount is the relative position of the object to the imaging plane as it is seen from the predetermined imaging plane (the plane conjugate with the film) and further, the relation between the lens position and the variation in the defocus amount by the movement of the lens is generally not in proportional relationship with each other and the variation in the defocus amount by the movement of the lens differs depending on the position of the lens and therefore, at a place whereat the lens position differs, the defocus amount cannot be simply increased or decreased relative to the lens position. So, in order to calculate the image plane movement speed, the CPU 7 calculates the relative value DP1C of the object position at the last accumulation central time as it is seen from the lens position at the accumulation central time now, by the following expression (3).

$$DP1C = P1 - LP0 \quad (3)$$

(Here, P1 is the object target position at the last time.)

The CPU 7 then converts the relative value DP1C into a corresponding defocus amount DF1C by the use of the defocus amount—lens driving amount conversion coefficient obtained at the current accumulation central time.

$$DF1C = DP1C/(KB*KL + DP1C*L) \quad (4)$$

The image plane movement speed S0 is found from the current defocus amount DF0, the defocus amount DF1C at the last accumulation central time as it is seen from the current lens position at the accumulation central time and the time interval therebetween, as shown by the following expression (5).

$$S0 = (DF0 - DF1C)/(T0 - T1) \quad (5)$$

A method of calculating the in-focus position changing speed will now be described with reference to FIG. 11. The in-focus position changing speed SP0 which is the amount of change in the focusing lens position per unit time is calculated from the lens position P1 for focusing on the object at the last accumulation central time T1, the lens position P0 for focusing on the object at the current accumulation central time T0 and the time interval therebetween, by the following expression (6).

$$SP0 = (P0 - P1)/(T0 - T1) \quad (6)$$

This embodiment uses the results of the current and the immediately previous focus detection for the calculation of the image plane movement speed and the in-focus position changing speed, but this need not always be done. The current results and the result at the time before the last may also be used. Also, calculation may be effected by the use of such past focus detection data that the time interval between the time T0 and the time T1 becomes longer than a predetermined time.

S302 tests whether the direction of the image plane movement speed S0 calculated now and the image plane movement speed S1 calculated at the last time is reversed, and if the direction is reversed, it is judged that the object has come off the focus detection area and therefore another object is detected and the direction of movement has been reversed, or it is judged that the object is an object unsuitable for forecast calculation and at S307, the moving object flag is cleared and advance is made to S308 so that the object may not be recognized as a moving object.

S303 tests whether the image plane movement speed S0 now is equal to or greater than a predetermined value Sth. If it is less than the predetermined value Sth, it is judged that the object is not a moving object, and advance is made to S307.

S304 calculates the ratio (S0/S1) of the image plane movement speed S1 at the last time to the current image plane movement speed S0 and tests whether this ratio is within a predetermined range. If this ratio is within the predetermined range, the result of focus detection now can be relied on and therefore advance is made to S305, where the object is judged to be a moving object. If the ratio is outside the predetermined range, it is considered that the object has come off the focus detection area and therefore another object has been detected and thus, advance is made to S307, where the object is not judged to be a moving object.

S305 sets the moving object flag because the object on which focus detection is being effected can be judged to be a moving object.

S306 substitutes SP0 for 9 lens movement target speed VP0 for lens control.

S307 clears the moving object flag because the object on which focus detection is being effected cannot be judged to be a moving object or is a stationary object.

S308 sets the lens movement target speed VP0 for lens control to 0.

The focusing discrimination subroutine of FIG. 12 will now be described. The focusing discrimination subroutine is shown in FIG. 12, and a graph illustrating the calculation of a defocus amount DF1F used for discrimination is shown in FIG. 13.

Figure 13:
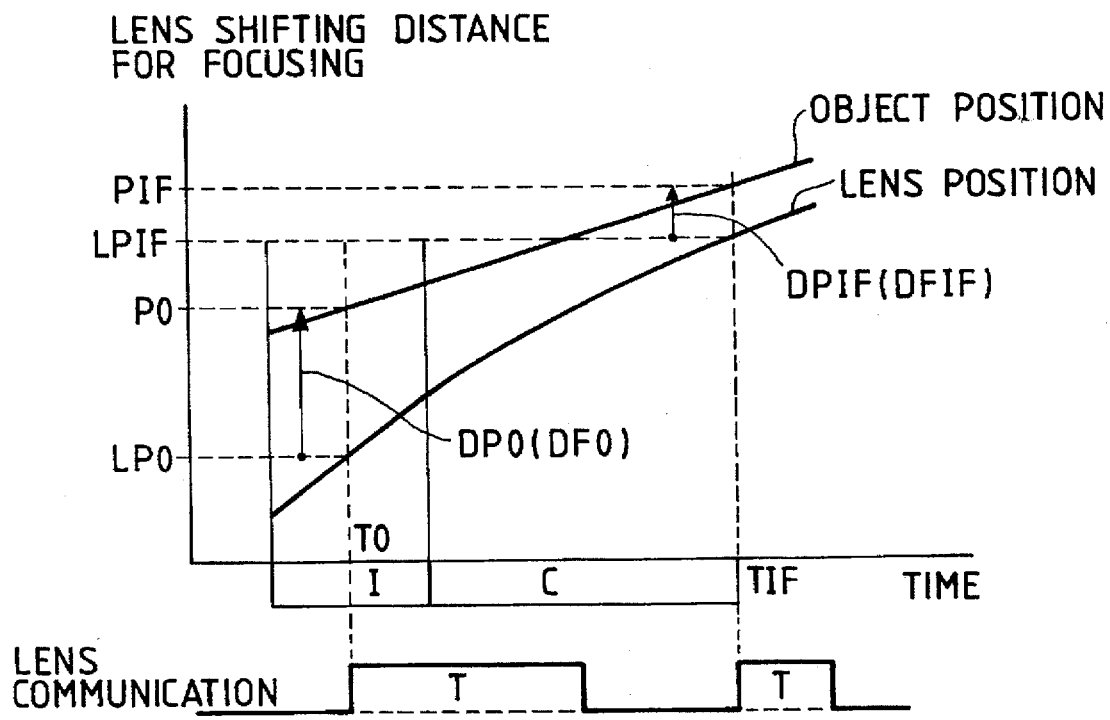
FIG. 13 is a graph illustrating the focusing discrimination.

In FIG. 13, the symbol "T" written as lens communication indicates the period during which by lens communication, the giving and taking of data are done between the camera body and the lens. The symbol "T" indicates the accumulation time of the photoelectric conversion element (CCD sensor), and the symbol "C" indicates the period of focus detection calculation.

In FIG. 12, S401 obtains the defocus amount—lens movement amount conversion coefficient from the interchangeable lens side by lens communication to calculate a defocus amount for discriminating focusing, because there are lenses in which the defocus amount—lens movement amount conversion coefficient changes greatly depending on the lens position.

S402 obtains the lens position LPIF at the lens communication starting time TIF. This is for calculating the defocus amount DFIF during focusing judgment (the defocus amount at the lens communication starting time).

S403 calculates the object position PIF at the lens communication starting time by the following expression (7).

$$PIF = VP0*(TIF - T0) + P0 \quad (7)$$

In this expression (7), TIF indicates the time when the lens communication of S401 is started. S404 calculates the residual driving amount DPIF during focusing judgment by the following expression (8).

$$DPIF = PIF - LPIF \quad (8)$$

The defocus amount DFIF for focusing discrimination is calculated by the following expression (9) by the use of the residual driving amount DPIF at the lens communication starting time and the defocus amount—lens driving amount conversion coefficient obtained in the lens communication of S401 (S404).

$$DFIF = DPIFI(KB*KL + DPIF*L) \qquad (9)$$

S405 detects whether the amount of movement of the lens from the current accumulation central time till the time of focusing judgment is smaller than a predetermined value IFJth. If the amount of movement of the lens is great, wrong focusing discrimination may sometimes take place due to a calculation error and therefore, if the amount of movement of the lens is greater than the predetermined value, focusing discrimination is not effected this time.

S406 discriminates whether the defocus amount DFIF during focusing judgment is within an allowed focusing range IFWth, and if it is within that range, advance is made to S407, where the focusing flag is set. If the defocus amount DFIF is greater than the allowed focusing range IFWth, advance is made to S408, where the focusing flag is cleared.

Figure 14:
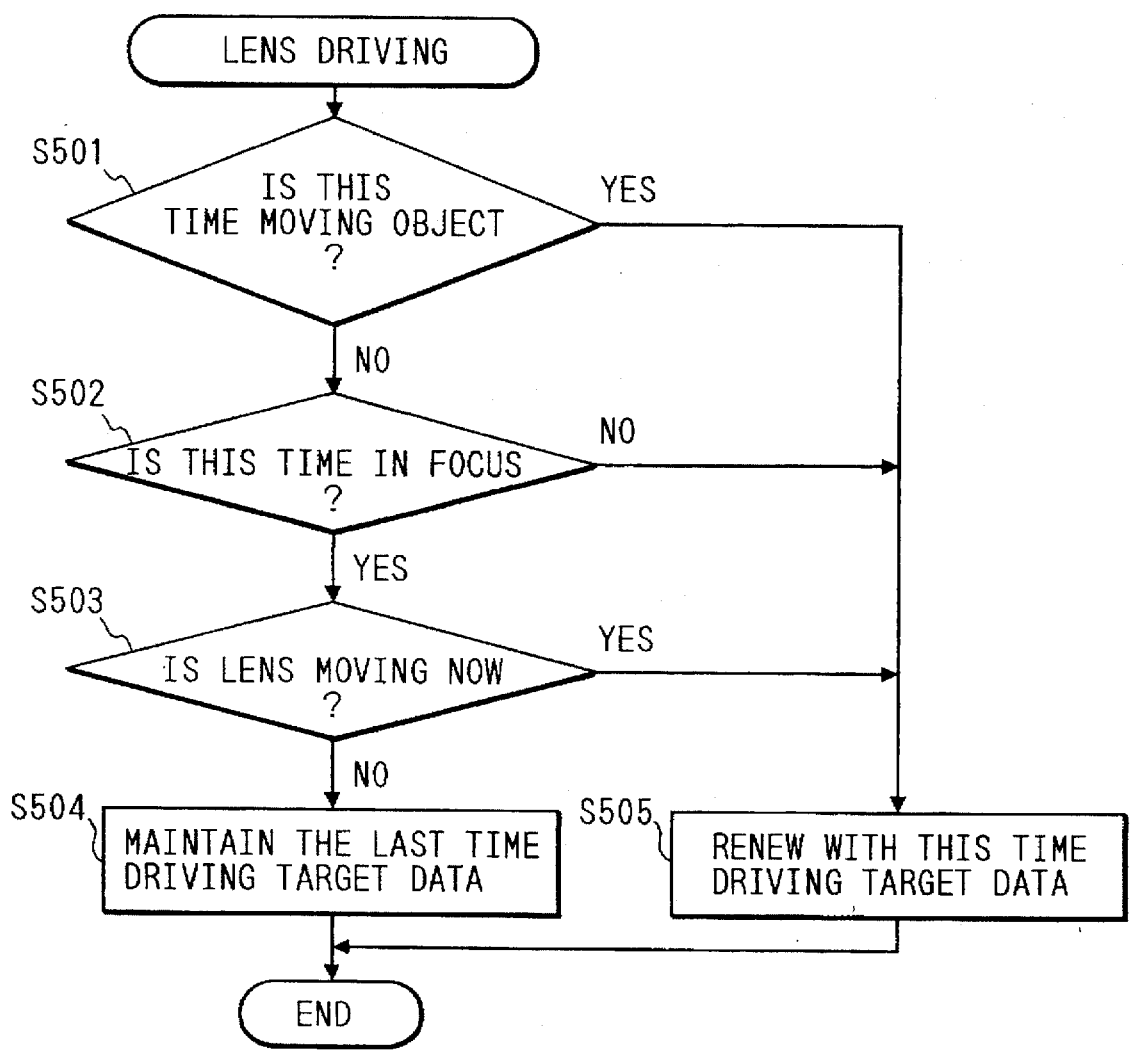
FIG. 14 is a flow chart of lens driving.

The lens driving subroutine shown in FIG. 14 will now be described.

S501 detects by a moving object flag whether the object on which focus detection is being effected is judged to be a moving object, and if the object is a moving object, lens driving is not stopped by focusing discrimination and therefore this step renews the driving target data to the driving target data calculated this time. The driving target data are the object position P0 at the accumulation central time now and the then lens movement target speed VP0.

S502 is executed if at S501, the object on which focus detection is being effect has not been judged to be a moving object, and if the lens is not judged to be in focus this time, this step renews the driving target data to the driving target data calculated this time. If at S502, the lens is judged to be in focus, advance is made to S503.

S503 discriminates whether the lens is moving, and if the lens is moving, S505 renews the driving target data to the driving target data calculated this time. If the lens is being driven, the lens is not immediately stopped even if it is within the in-focus range, but the lens is driven to a position in which the defocus amount becomes 0. S504 does not renew the driving target data to the driving target data now but maintains the last driving target data because if the lens is not being driven, new lens driving is not effected.

Figure 15:
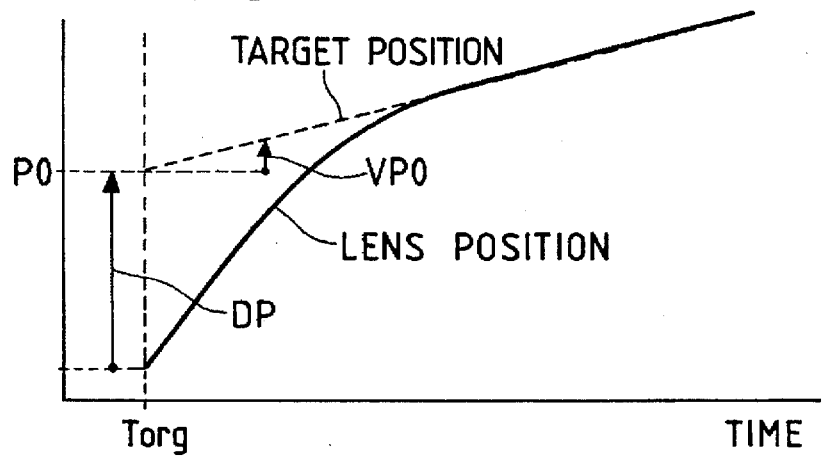
FIG. 15 is a graph illustrating the lens driving.

S505 sets the lens driving target data to a value calculated this time. Lens driving is effected in accordance with the set driving target data. Lens driving is controlled by the use of a reference time Torg and the then object position P0 and lens movement target speed VP0 so as to follow the straight line of the target position as shown in FIG. 15. DP in FIG. 15 represents the lens driving amount at the reference time Torg.

Release interruption occurring when the full-stroke depression switch of the operating member 13 becomes ON will now be described with reference to FIG. 16. Release interruption is executed at the starting by the full-stroke depression switch as well as when the full-stroke depression button is ON and the photographing operation has been completed (when film feeding and shutter charge have been completed). Release interruption is permitted when focus detection is once effected.

S601 starts to lift up the mirror by rotating the SQ motor 16 in the forward direction.

S602 starts to run the shutter leading curtain of the shutter 15 when the lifting-up of the mirror is terminated.

S603 starts to run the shutter trailing curtain in conformity with the exposure time.

S604 stops lens driving simultaneously with the start of the running of the shutter trailing curtain.

S605 starts to pull down the mirror by rotating the SQ motor in the reverse direction when the running of the shutter trailing curtain is terminated.

S606 starts to feed the film a predetermined time after the pulling-down of the mirror has been started. It is for preventing a great rush current by shifting the starting of the SQ motor and feed motor that the time of the starting of the pulling-down of the mirror and the time of the starting of film feeding are made to differ from each other. Focus detection is resumed within a predetermined time after the completion of the pulling-down of the mirror, and the step S103 of FIG. 6 is started and return is made to the main flow.

As has hitherto been described, in a camera provided with the automatic focus adjusting apparatus of the present invention, the threshold value setting means changes the threshold value for judging the object to be a moving object during the driving of the continuous shooting means and therefore, during continuous shooting, the threshold value for moving object discrimination can be made small. Thus, the camera recognizes even an object low in the image plane movement speed as a moving object and effects forecast driving and therefore, the camera takes no photograph out of focus.

Second Embodiment

Figure 17:
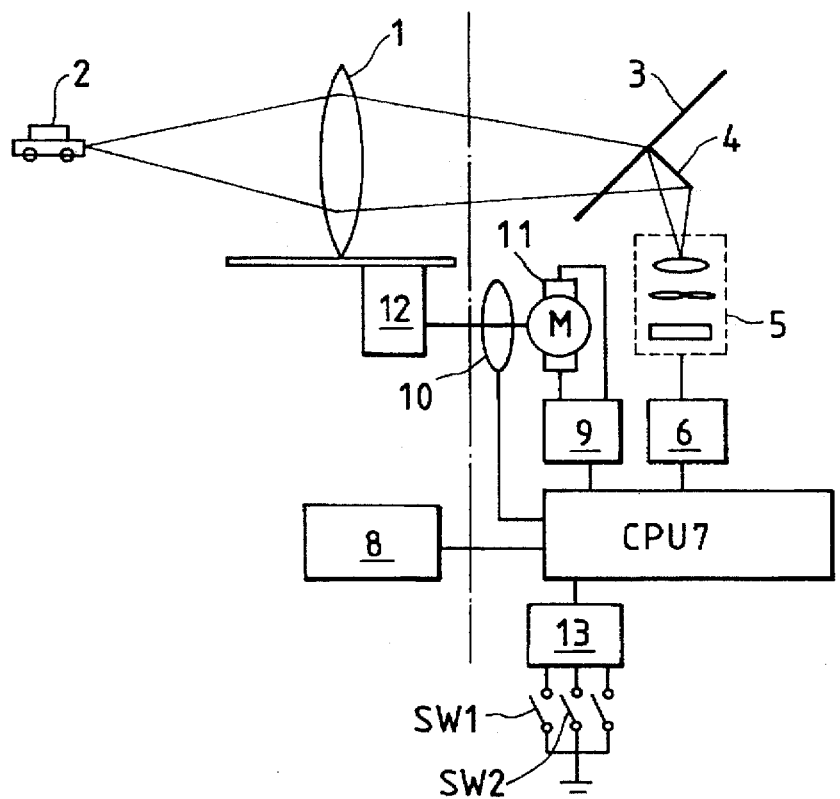
FIG. 17 shows the construction of a camera system which is a second embodiment of the present invention.

FIG. 17 shows the construction of a camera system which is a second embodiment of the present invention. This camera system is comprised of an interchangeable lens barrel and a camera body, and with the dot-and-dash line of FIG. 17, as the boundary, the left side shows the components of the lens barrel and the right side shows the components of the camera body. Components similar to those in FIG. 4 are given similar reference characters.

Part of light from an object 2 passed through a photo-taking lens 1 is directed to an AF module 5 via a main mirror 3 and a sub-mirror 4 and is converted into an electrical signal representative of the focus adjusted state of the photo-taking lens 1. The AF module 5 is a conventional focus detecting device comprised of a re-imaging optical system and a CCD sensor, and is controlled by a sensor driving circuit 6.

A CPU 7 receives a photoelectrically converted signal representative of the focus adjusted state from the AF module 5 and A/D-converts this photoelectrically converted signal, and stores it in a memory in the CPU 7. A lens information storing circuit 8 stores therein information inherent to the lens such as the focal length of the photo-taking lens 1 and the defocus amount—lens driving amount conversion coefficient. The CPU 7 finds the defocus amount which is the amount of out-of-focus of the photo-taking lens from the photoelectrically converted signal representative of the stored focus adjusted state, and calculates a lens driving amount on the basis of this defocus amount (i.e., focus adjustment information) and the defocus amount—lens driving amount conversion coefficient stored in the lens information storing circuit 8.

A motor control circuit 9 drives the photo-taking lens through a motor 11 and a moving mechanism 12 on the basis of a lens driving amount signal from the CPU 7, and monitors the amount of movement of the photo-taking lens or the lens position by an encoder 10 to thereby drive and control the motor 11. As a result, the focus adjusting operation for the photo-taking lens is performed.

The external operating member 13 of the camera body is comprised of a plurality of switches. The operating member 13 is comprised of a switch SW1 (a half-stroke depression switch) operatively associated with the release button of the camera to start the auto focus adjustment or the like of the photo-taking lens 1 by the first stroke depression of the release button, a switch SW2 (a full-stroke depression switch) for starting the exposure control sequence by the second stroke depression of the release button, etc.

Such control is executed by a software in the CPU 7. FIG. 18 is a main flow chart of the CPU 7 in the second embodiment of the present invention. In FIG. 18, steps similar to those in the first embodiment shown in FIG. 6 are given similar reference characters.

S101 effects the initialization of a memory and flags used, for example, the defocus amount detected in the past, the central time of the charge accumulation time of the CCD sensor of the AF module 5, a moving object flag (which indicates that the object is a moving object), a focusing flag (which indicates that the photo-taking lens is in focus), etc.

S102 tests whether the half-stroke depression switch is ON, and if the switch is not ON, return is made to S101, and if the switch is ON, advance is made to S103.

S103 is the CCD accumulation control subroutine. In the accumulation control subroutine, the control of the starting and termination of the charge accumulation in the CCD sensor of the AF module 5 is effected. Further, the average lens position being accumulated in each area is calculated by monitoring the pulse from the encoder 10.

S104 is the accumulation control subroutine, and A/D-converts an analog signal photoelectrically converted by the CCD sensor of the AF module 5 and stores it into a memory connected to the CPU 7.

S105 is the conventional defocus amount calculation subroutine. Here, the defocus amount is calculated on the basis of the photoelectrically converted signal stored in the memory.

Figure 1:
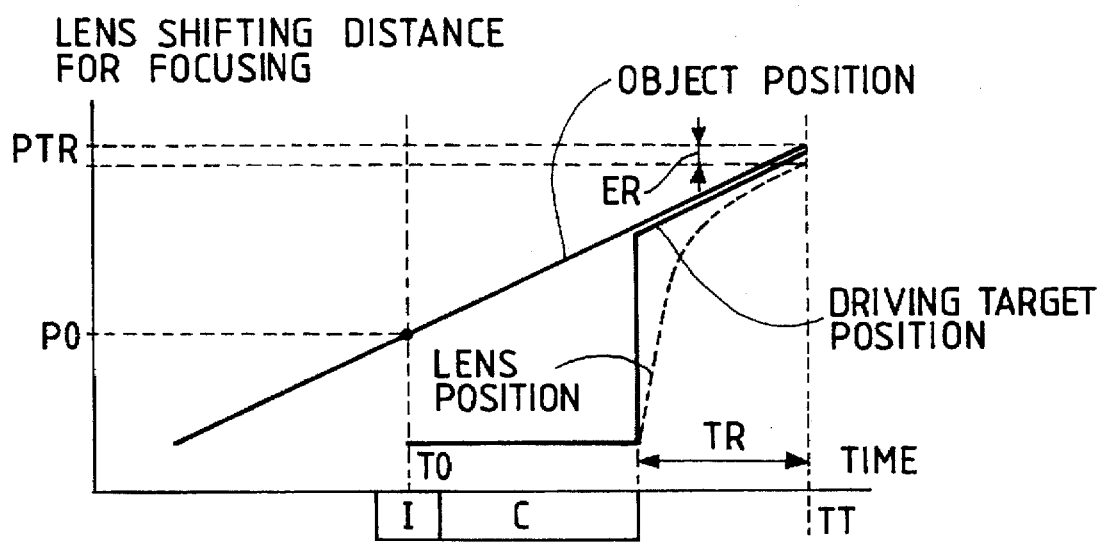
FIG. 1 is a graph illustrating lens driving in the case of a moving object.
Figure 2:
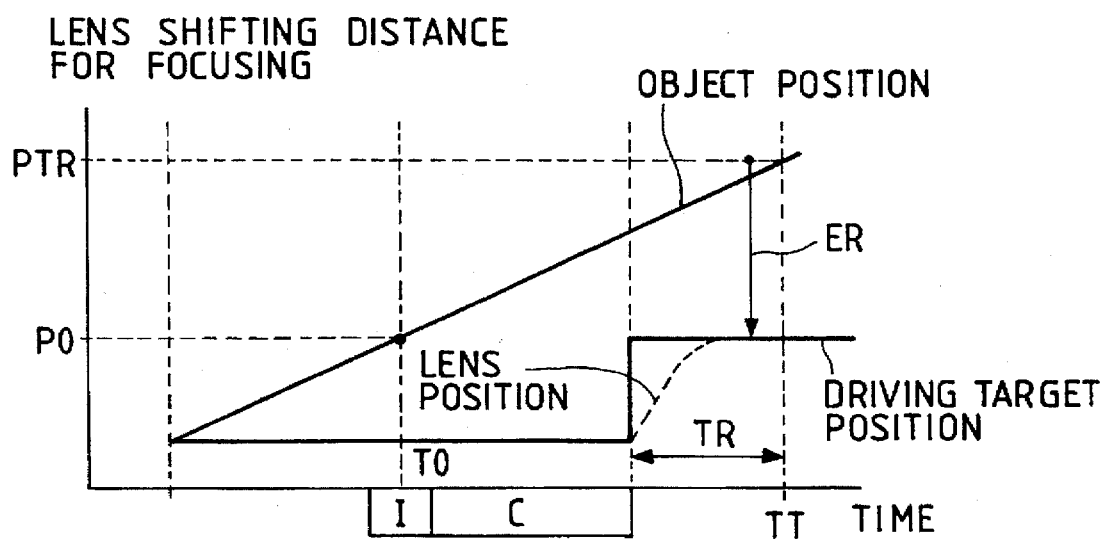
FIG. 2 is a graph illustrating lens driving in the case of a stationary object.
Figure 3:
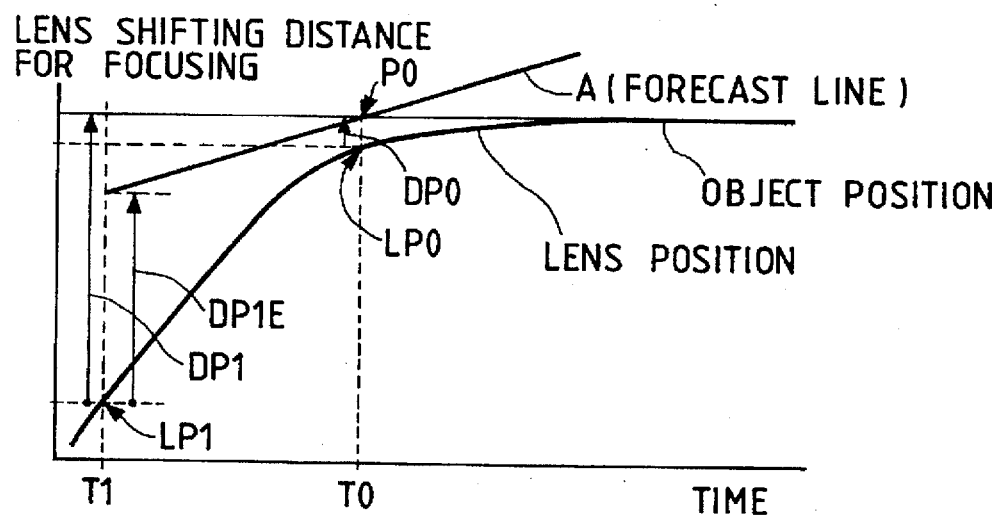
FIG. 3 is a graph illustrating a problem due to a focus detection error and a conversion error and illustrating an embodiment of the present invention.

S106 calculates the difference DP0 between the average lens position LP0 being accumulated and the object target position P0 being accumulated on the basis of the defocus amount DF0 calculated at S105 and the defocus amount—lens driving amount conversion coefficient LD0 obtained at the central time of charge accumulation (see FIG. 3).

S707 changes the moving object discrimination threshold value in conformity with the sum of the last defocus amount and the defocus amount now.

S708 forecasts the movement of the object in the future on the basis of the defocus amount calculated in the defocus amount calculation subroutine and the stored past focus adjustment information (the defocus amount, the average lens position and the accumulation central time).

S109 discriminates whether the photo-taking lens is in focus now.

S110 calculates the lens driving amount necessary for actually effecting lens driving.

The CCD accumulation control subroutine of S103 will now be described. In the accumulation control subroutine, the feedback pulse from the encoder 10 from the start to the end of the charge accumulation in the CCD sensor is counted to calculate the average lens position LP0 during charge accumulation in FIG. 3. In order to obtain lens information (the defocus amount—lens driving amount conversion coefficient, the open F value, etc.) at the central time T0 of the charge accumulation time of the CCD sensor, the CPU 7 and the lens information storing circuit 8 start lens communication at the time T0. The defocus amount—lens driving amount conversion coefficient LD (KL, L), the open F value, etc. included in the lens information vary depending on the lens position or the zoom position of the photo-taking lens and therefore, the timing of lens communication poses a problem. Here, the lens information storing circuit 8 is adapted to send the lens information at the start of lens communication.

Figure 19:
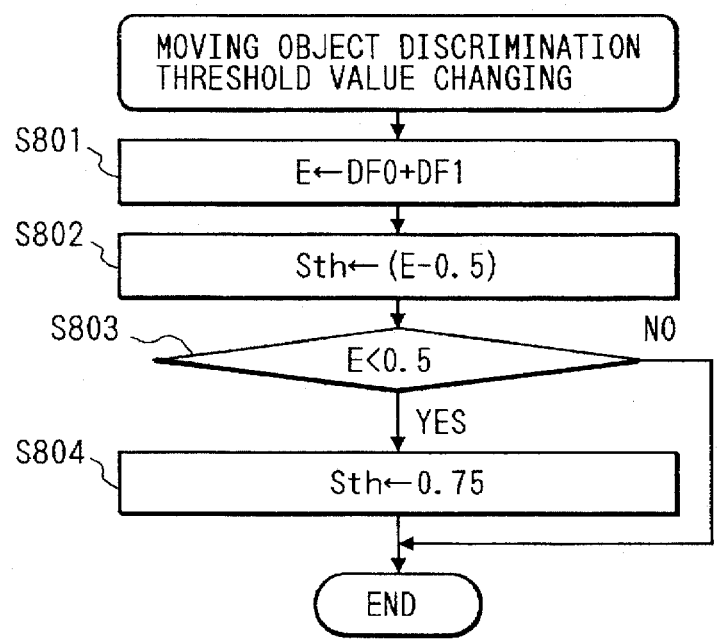
FIG. 19 is a flow chart of moving object discrimination threshold value changing.

The moving object discrimination threshold value changing subroutine of S707 will now be described with reference to FIG. 19. S801 finds the sum E of the defocus amount and the current last defocus amount by the following expression (10).

$$E = DF0 + DF1 \qquad (10)$$

Figure 20:
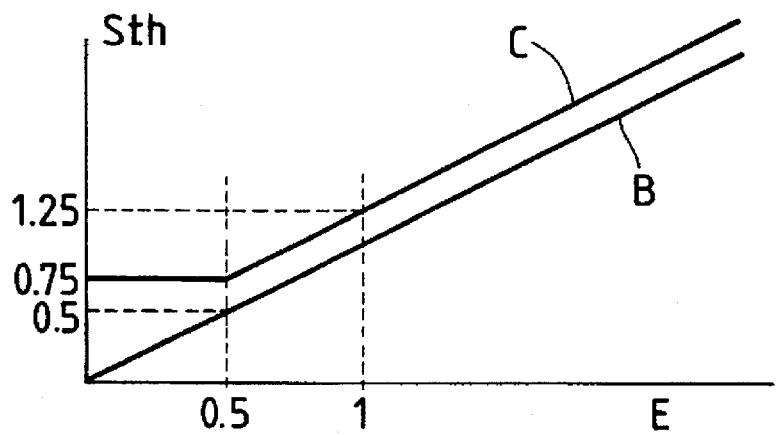
FIG. 20 is a graph representing the relation between a moving object discrimination threshold value and a defocus amount.

S802, S803 and S804 calculate a threshold value Sth as indicated by the curve C of FIG. 20 on the basis of the sum E of the defocus amounts. When the sum E of the defocus amounts is equal to or less than 0.5 mm, the threshold value Sth is set to 0.75 mm/S. When the sum E of the defocus amounts exceeds 0.5 mm, the threshold value Sth is varied by 1 mm/S per defocus amount 1 mm. That is, when the sum E of the defocus amounts is 1 mm, the threshold value Sth is set to 1.25 mm/S.

The curve B of FIG. 20 represents the error of the image plane movement speed when the error of the defocus amount—lens driving amount conversion is 10% and the time interval of image plane movement speed calculation is 200 ms. The threshold value Sth is set to a value greater than the error curve B.

Figure 21:
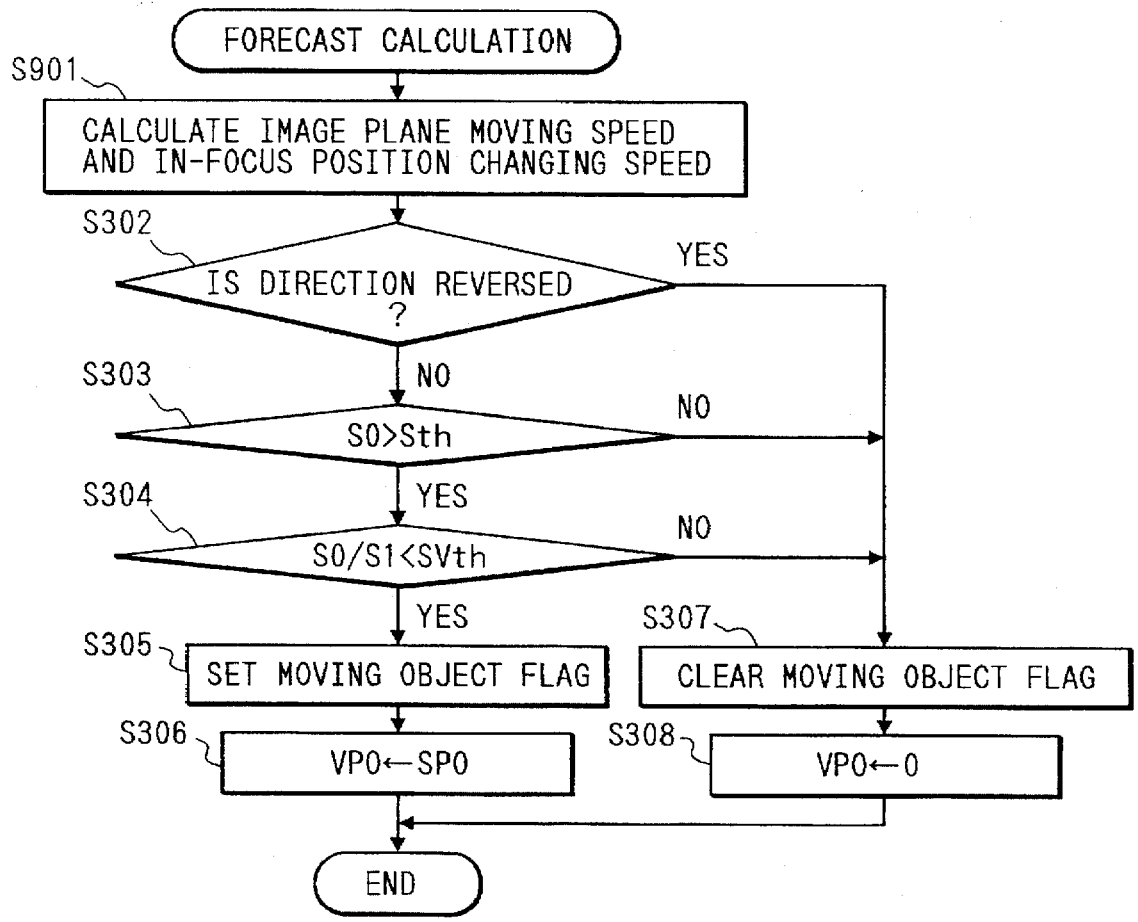
FIG. 21 is a flow chart of forecast calculation.

The forecast calculation subroutine of S708 will now be described with reference to FIG. 21. In FIG. 21, steps similar to those in FIG. 10 for the first embodiment are given similar reference characters.

Figure 11:
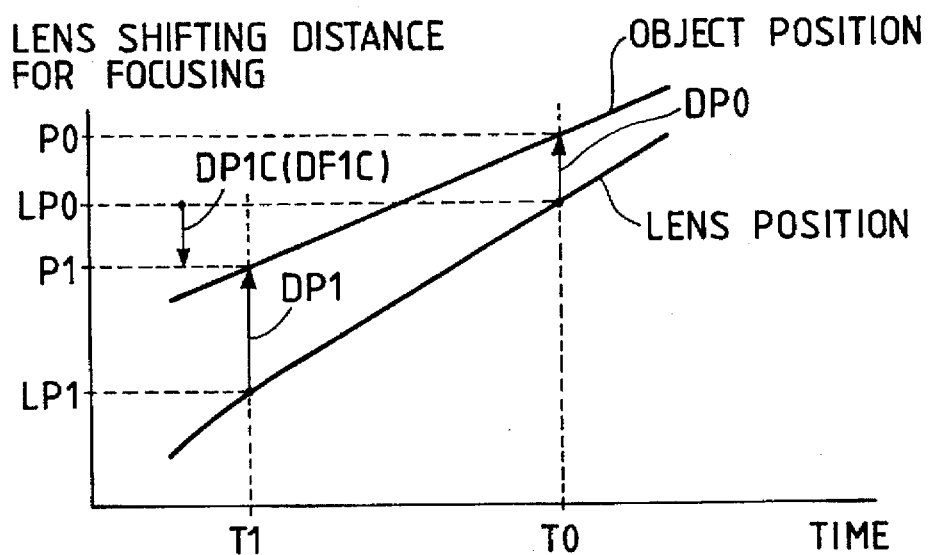
FIG. 11 is a graph illustrating a method of calculating an image plane movement speed.

S901 calculates the speed of movement of the image plane (image plane moving speed) caused by the movement of the object when it is supposed that the position of the lens has been fixed, and the changing speed of the lens position (in-focus position changing speed) at different times T1 and T0 in FIG. 11.

This image plane moving speed is utilized for moving object discrimination, and the in-focus position changing speed is utilized for lens movement control.

The method of calculating the image plane moving speed and the in-focus position changing speed has been described on the basis of FIG. 11 in the first embodiment and therefore need not be described here.

Figure 10:
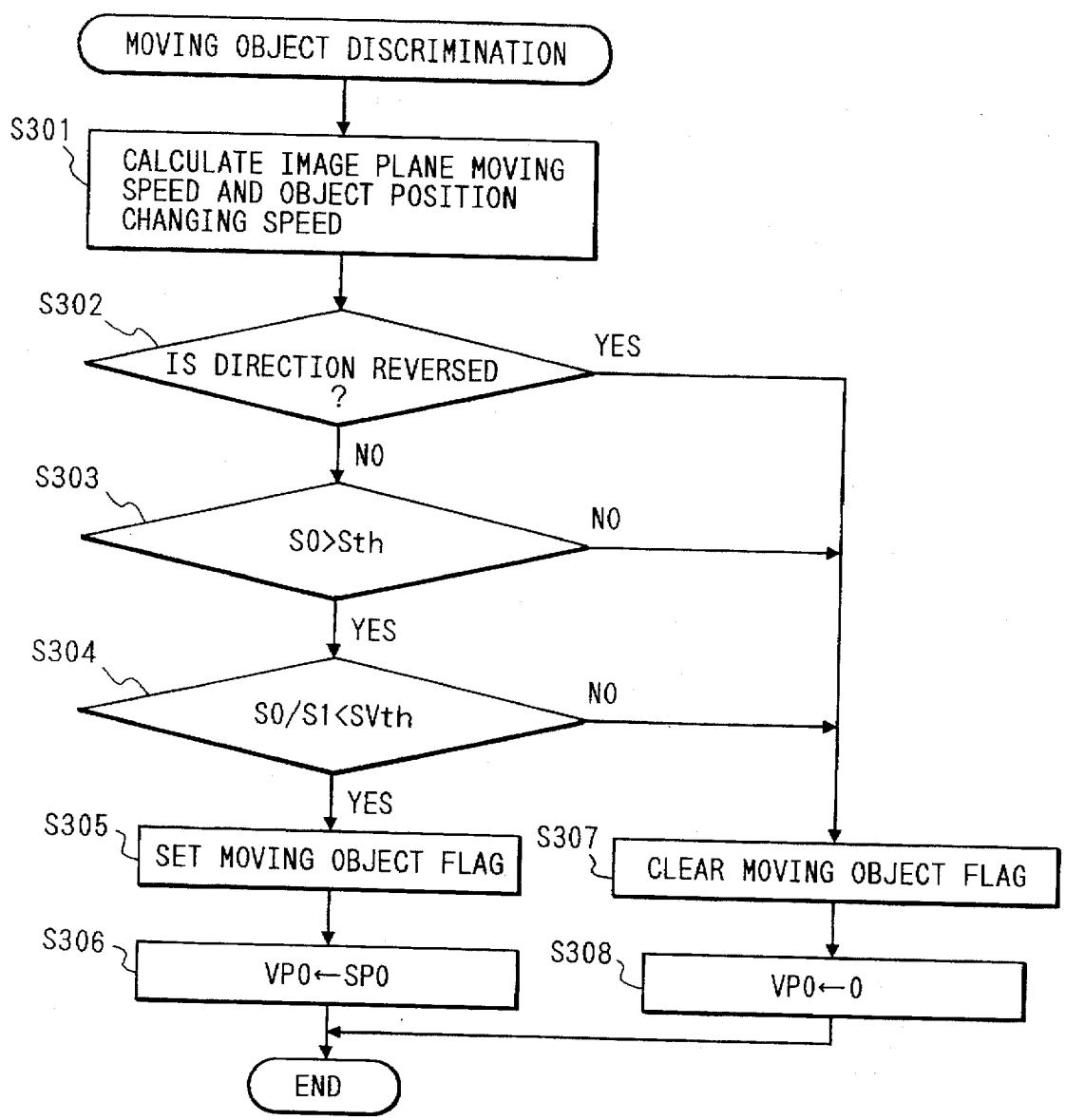
FIG. 10 is a flow chart of moving object discrimination.

The steps S302–S308 of FIG. 21 are similar to the steps shown in FIG. 10 and therefore need not be described.

While in the forecast calculation subroutine, the image plane moving speed is used for moving object discrimination, the image plane moving speed need not always be used, but the in-focus position changing speed may be used to discriminate a moving object.

In the second embodiment, the threshold value Sth of moving object discrimination is changed, based on the sum of the last defocus amount and the current defocus amount, but the defocus amount used when the image plane moving speed is calculated is not always the last defocus amount and therefore, it will be better to change the threshold value Sth based on the sum of the current defocus amount and the defocus amount used to calculate the image plane moving speed.

Third Embodiment

Figure 22:
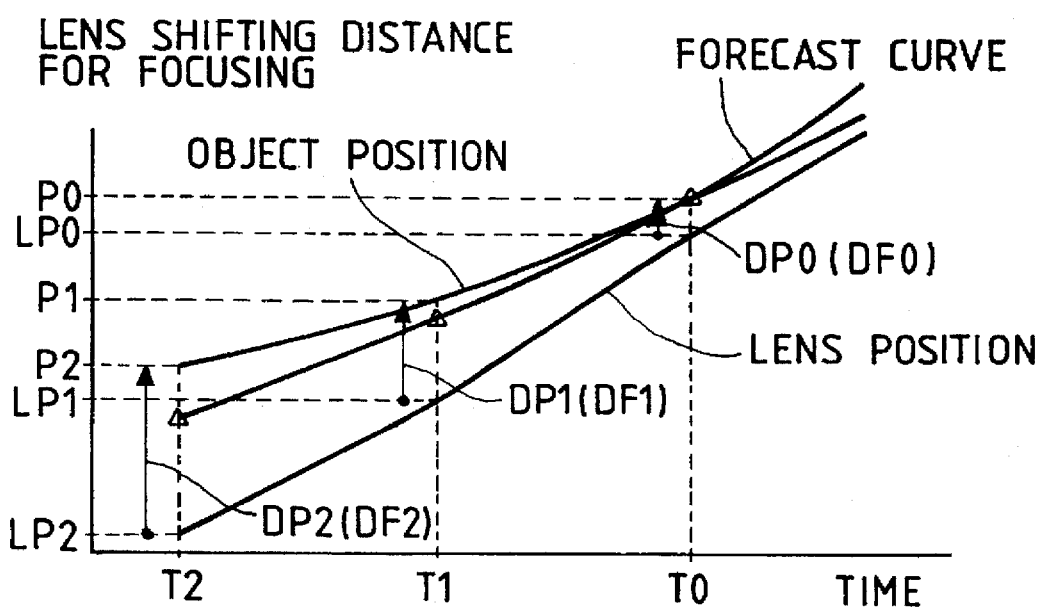
FIG. 22 is a graph illustrating the effect of lens driving by threshold value changing.

An example of application when a second-order or higher-order function or minimum square method approximation is used for the forecast calculation of S708 will hereinafter be described with reference to FIG. 22.

Lens positions at three focus detection times (T0, T1 and T2) in the past are defined as LP0, LP1 and LP2, the detected defocus amounts are defined as DF0, DF1 and DF2, and the amounts resulting from the detected defocus amounts having been converted into lens movement amounts are defined as DP0, DP1 and DP2. If there is no error of the defocus amount—lens movement amount conversion, the object positions P0, P1 and P2 at the respective times can be calculated accurately and the forecast curve of the object can be forecast.

However, the defocus amount—lens movement amount conversion includes an error depending on the defocus amount and thus, actually the position Δ is calculated and a great error occurs to the forecast curve. If the image plane moving speed is calculated in accordance with the forecast curve including a great error, an error will occur to the image plane moving speed.

If object discrimination is effected on the basis of such an image plane moving speed, wrong moving object discrimination will result. Particularly, a stationary object will be discriminated erroneously as a moving object. So, when the movement of the object is to be discriminated by the use of a second-order or higher-order function or minimum square method approximation, the threshold value of the image plane moving speed for moving object discrimination is changed in based on the sum of the defocus amounts used in the high-order function or the minimum square method approximation.

The present invention is not restricted to the above-described embodiments, but for example, can be suitably changed as will hereinafter be described.

While in the second and third embodiments, the threshold value of moving object discrimination is changed in conformity with the sum of the stored past defocus amounts, a sum may be taken by applying weight to each defocus amount, instead of a simple sum. This weight can be, for example, weight proportional to the defocus amount, and the rate of contribution to moving object discrimination can be made low for such a great defocus amount that the error of moving object discrimination will become great.

Also, the weighted mean of the defocus amounts may be calculated and the threshold value may be changed in conformity with the calculated weighted mean. By using the mean value, it is possible to suppress a sudden change in the threshold value.

The threshold value of moving object discrimination is adapted to continuously change for a change in the defocus amount, but it is not always necessary to do so. The threshold value of moving object discrimination may be set to a stepwise threshold value provided by grouping the defocus amounts such that a threshold value is given to a group.

Also, since it is expected that the current defocus amount becomes smaller than at least the last defocus amount, the threshold value of moving object discrimination may be determined by only the last defocus amount.

According to the present invention, the threshold value of moving object discrimination is changed based on focus adjustment information, whereby the wrong moving object discrimination of an object by the focus detection error and the calculation error or the like when the image plane moving speed is calculated can be reduced and more accurate moving object discrimination is made possible.

Also, according to the present invention, the threshold value of moving object discrimination is changed based on the last defocus amount and the current defocus amount and therefore, wrong moving object discrimination by the focus detection error and the error of the defocus amount—lens driving amount conversion can be reduced. Also, moving object discrimination is not inhibited by the defocus amount and therefore, even when the defocus amount is great, moving object discrimination can be effected if the object moving speed is great.

What is claimed is:

1. A camera provided with an automatic focus adjusting apparatus, said automatic focus adjusting apparatus including:
    a focus detecting device to detect a focus adjusted state of a photo-taking lens;
    a monitor device to monitor a movement of the photo-taking lens;
    an image plane movement speed calculating circuit to calculate an image plane movement speed based on the focus adjusted state and the movement of the photo-taking lens;
    a moving object discriminating circuit to discriminate an object as a moving object when the image plane movement speed is equal to or greater than a threshold value;
    a continuous shooting device to effect continuous shooting; and
    a threshold value setting circuit to set the threshold value and to change the threshold value when said continuous shooting device is driven.

2. A camera according to claim 1, wherein said threshold value setting circuit sets the threshold value to a first threshold value when said continuous shooting device is not driven and sets the threshold value to a second threshold value smaller than the first threshold value when said continuous shooting device is driven.

3. An object movement detecting apparatus including:
    a focus detecting device to detect focus adjustment information for a focus adjusted state of a photo-taking lens;
    a storing circuit to store the focus adjustment information;
    an image plane movement speed calculating circuit to calculate an image plane movement speed based on the focus adjustment information stored in said storing circuit;
    a moving object discriminating circuit to discriminate whether the image plane movement speed calculated by said image plane movement speed calculating device is equal to or greater than a threshold value, thereby discriminating an object as a moving object; and
    a moving object discrimination threshold value setting circuit to set and change the threshold value based on the focus adjustment information stored in said storing circuit.

4. An apparatus according to claim 3, wherein the focus adjustment information includes a defocus amount.

5. An apparatus according to claim 4, wherein said moving object discrimination threshold value setting circuit sets and changes the threshold value based on a sum of a current defocus amount and a previous defocus amount.

6. An apparatus according to claim 4, wherein said moving object discrimination threshold value setting circuit sets and changes the threshold value based on a sum of defocus amounts used to calculate the image plane movement speed by said image plane movement speed calculating circuit.

7. An apparatus according to claim 4, wherein said moving object discrimination threshold value setting circuit sets and changes the threshold value based on a previous defocus amount.

8. An apparatus according to claim 3, which is provided in a camera.

9. A camera with a continuous shooting device and an automatic focus adjusting apparatus, the automatic focus adjusting apparatus comprising:

a focus detecting device to detect focus adjustment information for a focus adjusted state of a photo-taking lens;

an image plane movement speed calculating circuit to calculate an image plane movement speed based on the focus adjustment information;

a moving object discriminating circuit to discriminate an object as a moving object when the image plane movement speed is equal to or greater than a threshold value; and, a threshold value setting circuit to set the threshold value to a first threshold value when the continuous shooting device is not driven and to change the threshold value to a second threshold value smaller than the first threshold value, when the continuous shooting device is driven, for the moving object discriminating circuit to recognize a slow moving object.

10. A method to recognize a slow moving object in a camera with a continuous shooting device and an automatic focus adjusting apparatus, comprising the steps of:

detecting focus adjustment information for a focus adjusted state of a photo-taking lens;

calculating an image plane movement speed based on the focus adjustment information;

discriminating an object as a moving object when the image plane movement speed is equal to or greater than a threshold value; and, setting the threshold value to a first threshold value when the continuous shooting device is not driven and changing the threshold value to a second threshold value smaller than the first threshold value when the continuous shooting device is driven.

11. A method as recited in claim 10, wherein said detecting step detects defocus amounts and said setting step sets the threshold value based on the defocus amounts.

12. A method as recited in claim 10, wherein said detecting step detects a current defocus amount and a previous defocus amount and said setting step sets the threshold value based on a sum of the current defocus amount and the previous defocus amount.

13. A method as recited in claim 10, wherein said detecting step detects a current defocus amount and a previous defocus amount and said setting step sets the threshold value based on the previous defocus amount.

* * * * *